United States Patent
Wirfalk (10) Patent No.: US 10,502,652 B2
(45) Date of Patent: Dec. 10, 2019

(54) SYSTEM FOR MONITORING PIPELINE LEAKAGE, PIPELINE ELEMENT PROVIDED WITH THE SYSTEM, AND METHOD FOR MOUNTING THE MONITORING SYSTEM ONTO A PIPELINE

(71) Applicant: WIDECO SWEDEN AB, Borås (SE)

(72) Inventor: Arnold Wirfalk, Borås (SE)

(73) Assignee: WIDECO SWEDEN AB, Borås (SE)

( * ) Notice: Subject to any disclaimer, the term of this patent is extended or adjusted under 35 U.S.C. 154(b) by 574 days.

(21) Appl. No.: 15/543,525

(22) PCT Filed: Jan. 29, 2014

(86) PCT No.: PCT/SE2014/050114
§ 371 (c)(1),
(2) Date: Jul. 13, 2017

(87) PCT Pub. No.: WO2014/120074
PCT Pub. Date: Aug. 7, 2014

(65) Prior Publication Data
US 2018/0024024 A1    Jan. 25, 2018

(30) Foreign Application Priority Data

Jan. 29, 2013 (SE) .................................. 1350098
Jan. 31, 2013 (SE) .................................. 1350115

(51) Int. Cl.
*G08B 21/18* (2006.01)
*G01M 3/18* (2006.01)

(52) U.S. Cl.
CPC ............. *G01M 3/183* (2013.01); *G08B 21/18* (2013.01)

(58) Field of Classification Search
CPC ............................. G01M 3/183; G08B 21/18
USPC ........................................................ 340/605
See application file for complete search history.

(56) References Cited

U.S. PATENT DOCUMENTS

| | | | | |
|---|---|---|---|---|
| 4,206,632 A | * | 6/1980 | Suzuki | G01M 3/165 174/11 R |
| 4,949,076 A | * | 8/1990 | Wann | G01M 3/16 324/533 |
| 5,177,996 A | * | 1/1993 | Sahakian | G01M 3/165 324/533 |
| 5,343,191 A | * | 8/1994 | McAtamney | G01M 3/283 340/605 |

(Continued)

FOREIGN PATENT DOCUMENTS

| | | |
|---|---|---|
| DE | 102009058330 A1 | 6/2011 |
| JP | 54136887 A * | 10/1979 |

(Continued)

OTHER PUBLICATIONS

Machine translation of KR 20080056531A.*

*Primary Examiner* — Kam Wan Ma
(74) *Attorney, Agent, or Firm* — Capitol City TechLaw (57) ABSTRACT

A monitoring system is provided for the identification and location of leakage of a fluid at least one pipe joint consisting of two abutting non-insulated pipes. The monitoring system comprises at least one first detector for detecting fluid, located at a first pipe joint, and a jacket piece provided locally over the first pipe joint, the jacket piece together with the non-insulated pipes forming a sealed space containing the first detector.

16 Claims, 4 Drawing Sheets

(56) References Cited

U.S. PATENT DOCUMENTS

| | | | | |
|---|---|---|---|---|
| 5,410,255 | A | * | 4/1995 | Bailey .................. G01M 3/165 174/11 R |
| 5,574,377 | A | * | 11/1996 | Marquez-Lucero ......................... G01M 3/045 174/11 R |
| 6,935,160 | B2 | * | 8/2005 | Hong .................... G01M 3/165 324/240 |
| 9,541,665 | B2 | * | 1/2017 | Shanks ................ E21B 47/102 |
| 2007/0051166 | A1 | * | 3/2007 | Baker .................... G01M 3/188 73/40.5 R |
| 2014/0208831 | A1 | * | 7/2014 | Ghodrati ............... G01M 3/042 73/46 |

FOREIGN PATENT DOCUMENTS

| | | | |
|---|---|---|---|
| KR | 20080056531 | A * | 6/2008 |
| KR | 101293190 | B1 * | 8/2013 |
| WO | 9506237 | | 3/1995 |
| WO | 2007119056 | A1 | 10/2007 |

\* cited by examiner

SYSTEM FOR MONITORING PIPELINE LEAKAGE, PIPELINE ELEMENT PROVIDED WITH THE SYSTEM, AND METHOD FOR MOUNTING THE MONITORING SYSTEM ONTO A PIPELINE

This application claims priority under 35 USC 119(a)-(d) to SE patent application Nos. 1350098-8 filed Jan. 29, 2013, and 1350115-0 filed Jan. 31, 2013, the entire contents of both of which are incorporated herein by reference.

FIELD OF THE INVENTION

The invention relates generally to systems for monitoring piping leakage from non-insulated pipes, fittings and joints of pipes for fluids, including pipes of steel, nodular cast iron, concrete or plastic. The invention relates particularly to a system for monitoring piping leakage and to a pipeline element provided with the system and a method for mounting the same.

BACKGROUND

Non-insulated pipelines are made up of joined piping elements such as pipes and fittings. Such pipelines can be, for example, pipes for drinking water, wastewater, storm water, oil pipelines, gas pipelines, district cooling pipes, or district heating pipes. Several of these pipelines are normally located underground or underwater (under ditch pipelines). Pipelines for industries, refineries, etc. are also joined using non-insulated pipes and fittings and are usually located above ground. Pipes and fittings are typically made of metal or plastic, and pipes of abutting piping elements are welded together or connected using rubber ring joints. The most common problems with these non-insulated pipelines located underground or above ground are leaky joints.

An estimated 90% of all leakages in modern plastic pipelines relate to the joints between pipe lengths, and between fittings and pipe lengths. In cities, the length of each pipe in the piping system is normally about 6 meters, to allow for easier piping along existing facilities. Thus, there is a pipe joint every six meters. There are also other pipe lengths, such as pipes with a length of 12, 16, or even longer pipes. The reason for leakage at pipe joints may be that the rubber ring at one end of the pipe has not been mounted, leaks in the rubber ring joint due to dirt between rubber ring and pipe, damaged rubber ring, the tip end not being sufficiently inserted into the sleeve, excess deflection in the sleeve etc. causing the leakages. Damaged mirror welds between pipes can be found. This may occur due to improper welding temperature, inadequately cleaned weld surfaces, weld surfaces not being flat, etc.

This can have major negative consequences for the affected operations, breakdowns, costs of leaking drinking water and gases, and environmental degradation in cases of leaking sewage water, oil and gas. It is therefore important to detect leakage at an early stage and to locate the fault as precisely as possible. Even a small hole in a water supply line means significant water losses. Piping leakage accounts for about 15% of the produced drinking water in Sweden, corresponding to 3.5 $m^3$/km per day. A hole 5 mm big costs SEK 23,000 a year in case of continued leakage. Furthermore, there are additional costs to identify the leakage. There is also continuous monitoring and identification of leakage to maintain the status of the piping network and to reduce the risk of ingress of contaminated water.

Current methods for the identification and location of leakage are associated with very high costs, not least for underground pipelines. Leakage from underwater pipelines is also difficult to detect. One method of identifying leakage from underwater sewer lines is the so-called 'seagull method'. If the population of circulating seagulls increases sharply close to a sewer line, leakage can be suspected. Other methods may be to seal the upstream end of the pipeline to see if any water emerges from the downstream end, pressure measurements, and emptying followed by visual inspection. For underground pipelines, TV inspection is a common but costly method. Pressure pipelines from pump stations can be inspected by checking the function of the pump(s) and measuring the pressure. However, it is difficult to detect minor leakages if there are pressure sensors only at the pump station and not in the piping network.

Along pipelines there are often a number of wells that should also be continuously monitored using level monitoring, for example to avoid overflow. Flux and pressure are also measured in the wells.

Thus, there is a need to find a less costly and improved monitoring system for the identification and location of leakage in non-insulated pipes.

SUMMARY OF THE INVENTION

An object of the invention to provide a monitoring system for the identification and location of leakage of a fluid at at least one pipe joint consisting of two abutting non-insulated pipes for fluids. The monitoring system comprises:
at least one first detector for detecting fluid, located at a first pipe joint; and
a jacket piece provided locally over the first pipe joint, the jacket piece together with the non-insulated pipes forming a sealed space containing the first detector and the pipe joint.

Another object of the invention is to provide a monitoring unit for the identification and location of leakage of a fluid in a piping system, comprising a receiver for receiving an output signal from a detector according to claim 1 or an alarm device according to claim 4, and identifying from the received output signal the geographical position of the detector, and also the status of current leakage detection from the detector.

Another object of the invention is to provide an alarm device for the identification and location of leakage of a fluid in a piping system, comprising a receiver for receiving an output signal from a detector according to claim 1, a transmitter for transmitting information from the received output signal to a monitoring unit for identifying, based on the transmitted information, the geographical position of the detector, and also the status of current leakage detection from the detector.

Another object of the invention is to provide a method for mounting a detector according to claim 1 for the identification and location of leakage of fluid at at least one pipe joint consisting of two abutting non-insulated pipes for fluids, comprising the steps of mounting the detector for fluid detection located at a first pipe joint, connecting an alarm cable to the detector, mounting a jacket piece locally over the first pipe joint, the jacket piece together with the non-insulated pipes forming a sealed space containing the first detector, the alarm cable running inside the space from the detector between the local jacket piece and at least one of the non-insulated pipes and along at least one of the non-insulated pipes.

Another object of the invention is to provide a computer readable medium containing software executable by a processor, the software comprising computer program code for performing the steps of: receiving an output signal from a detector according to claim 1, the output signal comprising information regarding the status of current leakage detection, an identity or address unique to the detector, or information regarding the geographical position of the detector, and based on the received output signal generating an alarm when the output signal includes information regarding leakage, and presenting the alarm on a display screen.

Another object of the invention to provide a mobile device comprising a software application arranged to: receive the transmitted signal from the processor according to claim 22, and present the information regarding leakage, the identity or address unique to the detector, or information regarding the geographical position of the detector on a display of the mobile device.

A major advantage of the present invention is that leakage from non-insulated pipes can be quickly identified. Moreover, the monitoring system according the embodiments disclosed below is far more cost-effective than hitherto known solutions.

DESCRIPTION OF EMBODIMENTS

Figure 1:
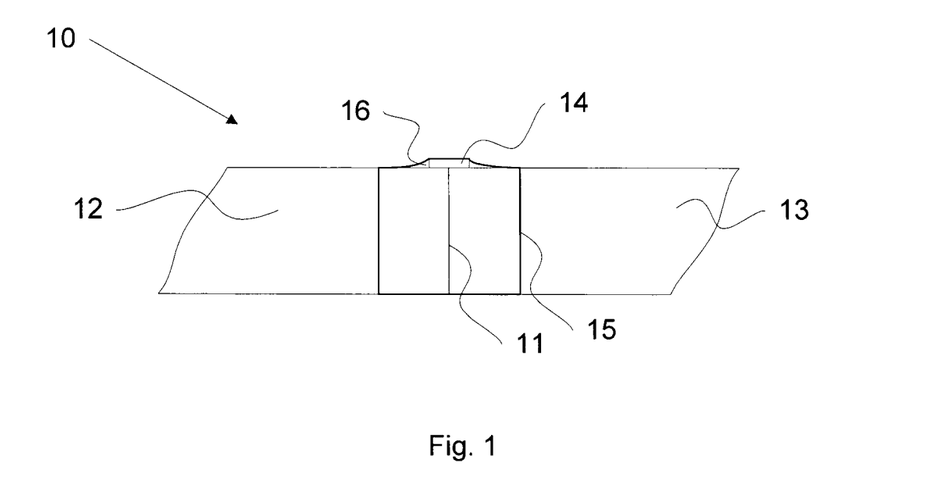
FIG. 1 describes a monitoring system according to one embodiment.

FIG. 1 describes a monitoring system 10 for the identification and location of leakage of a fluid at a pipe joint 11 consisting of two abutting non-insulated pipes or piping elements 12, 13 for fluids. A piping element can, for example, be a pipe bend, a 'T' piece, or a valve. A detector 14 for detecting fluid is located at the pipe joint 11. A jacket piece 15 is provided locally over the pipe joint 11. The jacket piece 15, together with the non-insulated pipes 12, 13, 121, forms a sealed space 16 containing the first detector. An advantage of the monitoring system according to FIG. 1 is that it is significantly less expensive than the solutions using fully jacketed pipes, as only one local jacket piece over the pipe joint is needed.

The jacket piece can consist of a so-called crimp sleeve which is crimped around the pipe joint after the detector has been positioned there. The mantle piece may be formed with an inner layer of bitumen or mastic providing a water- and gastight bandage over the detector and the pipe joint.

The crimping of the jacket piece can be achieved, e.g., by heat treatment.

A crimpable jacket piece gives rise to a number of technological effects. Because of the crimping, the sealing between the jacket piece and the pipe can be guaranteed with great certainty. Since the pipes are intended to be placed in a medium such as ground or water, it is of great importance that the medium outside the pipe and jacket piece cannot penetrate into the space 16, as this would affect the leakage detection and could possibly initiate a false alarm from the detector. Thus, crimpable jacket pieces for leakage detection are suitable for pipelines located outdoors or in conditions where the ambient moisture could otherwise affect the leakage detection.

Another advantage of crimpable jacket pieces is that the volume of the space 16 created between the pipe and the jacket piece can be made as small as possible. This makes the installation less bulky and also improves the possibilities of rapid detection of leaking fluid as the volume is as small as possible.

According to one embodiment, the jacket piece can consist of a complete crimp sleeve which must be mounted onto the pipe before the pipes are joined.

In an alternative embodiment, the jacket piece consists of a divisible crimp sleeve with a locking patch which can be fitted after the pipes have been joined.

The width of the jacket piece can be adapted depending on the type of pipe joint, but a consistent advantage of the monitoring system according to FIG. 1 is that leakage detection is enabled with a locally provided jacket piece which reduces the costs compared to the known solutions for insulated piping.

Typically, the pipes of the piping system have a diameter of 25 mm to about 1 meter. The locally provided jacket piece can have a width of 10 cm to 1 meter, such as 30 cm, 60 cm, or 70 cm depending on the design of the joint. For a pipe with a diameter of 50 cm, a local jacket piece about 30 to 35 cm wide can be used. Said width of the jacket piece can be defined in either uncrimped or crimped configuration.

The fluid flowing through the pipes can be all kinds of liquids or gases, such as water, oil, or natural gas. Thus, each detector is adapted to detect leakage of the type of fluid used in the pipes.

Figure 2:
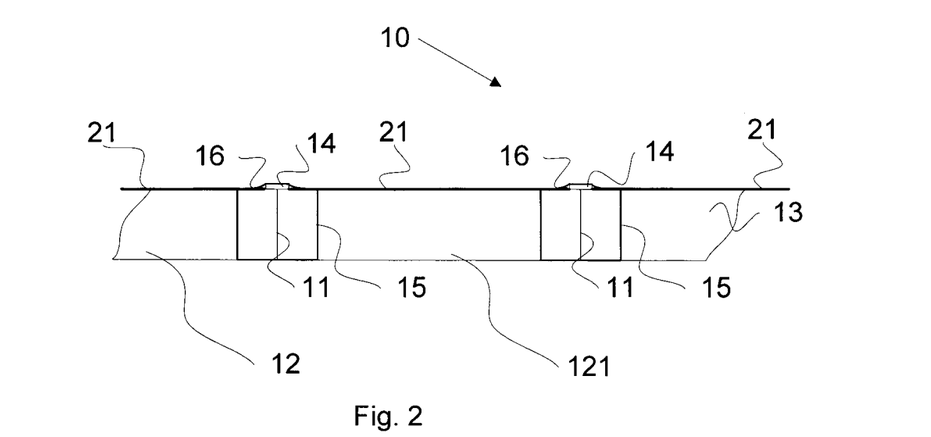
FIG. 2 describes a monitoring system according to another embodiment.

In the case of a pipeline comprising several pipe joints, detectors can be placed at each pipe joint according to FIG. 1 and then be connected to each other by means of an alarm cable 21; see FIG. 2. The alarm cable is specially designed for the purpose. For example, its leads can be straight or spiraled. The alarm cable should also be adapted for underground placement in cases where the pipes 12, 13, 121 are designed to be underground when in use. An alarm cable with straight leads makes the distance to a leakage detected by the TDR (Time-Domain Reflectometer) substantially the same as the physical distance to the leakage along the pipeline, since the length of the internal leads is the same as the length of the alarm cable. Thus, the distance to leakage detected by the TDR is directly dependent on the distance related to the length of the electric lead inside the alarm cable.

If the internal leads of the alarm cable are spirally arranged along the length of the alarm cable, the spiral's pitch angle and the spiral's radius must be taken into account when determining the physical distance to a leakage. A spiral lead running inside the alarm cable is longer than the length of the alarm cable. Thus, an alarm cable 1 meter long can accommodate more than 1 meter of lead if the latter is spirally arranged. Consequently, if leakage is detected in an alarm cable with spirally arranged leads, the physical distance to the leakage would be less than the distance calculated by the TDR, as the distance to leakage detected by the TDR is directly dependent on the distance related to the electric lead's length inside the alarm cable. A monitoring unit or alarm device can thus be arranged to receive information about the pitch angle and radius of the alarm cable's internal lead in order to translate the TDR's detected lead distance into a physical distance along the pipeline, so that staff can be sent to the correct site to fix the leakage.

A major advantage of connecting multiple detectors in a loop using at least one alarm cable is that the cable costs can be kept down compared to systems where an alarm cable is directly connected to only one detector. Furthermore, the loop means that the power consumption of the system can be kept lower than in corresponding solutions without a loop. This is because the same current pulses that are generated by the TDR can be utilized at different detector locations, thus eliminating the need to power each detector separately.

The detector according to FIG. 1 can be arranged with means for wirelessly transmitting the output signal to an alarm device 31 or monitoring unit 32 according to a known wireless communications protocol, such as via protocols for Bluetooth, radio waves, GSM, 3G, GPRS, or 802.11g/b/n, WIFI. In these cases, the output signal can be read using a portable or stationary alarm device which, when within the range of the wireless transmission from the detector, can identify leakage.

In one embodiment, the monitoring unit consists of the alarm device, thus incorporating the functionality of the alarm device in the monitoring unit.

According to FIG. 2, a monitoring system according to a second embodiment is described. This monitoring system comprises at least one second detector 14 for detecting fluid, located at a second pipe joint 11, the first detector and the second detector being connected to each other by at least one alarm cable 21, which is preferably insulated.

Every detector of the monitoring system can be coupled to any other detectors of the monitoring system by way of such an alarm cable. The alarm cable preferably comprises at least two leads. In one embodiment, the alarm cable can have a substantially flat cross-section, in order for this cross-section to yield good sealing between the jacket piece and the non-insulated pipes around every pipe joint.

In an alternative embodiment, the cross-section of the alarm cable can be round. To achieve reliable sealing between the jacket piece and the pipe, it is possible to wind an additional layer of bitumen around the cable before the jacket piece is crimped. Such a layer of bitumen can be e.g. around 50 mm wide. A round cross-section of the alarm cable, compared to with a flat cross-section, also makes it easier to bend the cable laterally, e.g. at 'T' junctions in the loop of the piping system. The detector can on both sides be provided with pre-connected, shorter, flat alarm cables, which can be e.g. up to 50 cm long, to enable rapid splicing to the alarm cable running between the detectors.

Preferably, the alarm cable of the detector is spliced together with the longitudinal alarm cable provided between the detectors within the space formed by the jacket piece and the pipes. This way, the risk of external impact on the alarm cable splicing is reduced. In some cases, splicing of the alarm cables can also take place outside the jacket piece and the space sealed after crimping.

In some cases, when the pipes have metallic characteristics, every detector could be connected by an alarm cable to only one lead, the metallic characteristics of the pipes thus being used as a lead.

The detector and alarm cable can be provided directly on the pipe or pipes comprising the piping system.

In one embodiment, the detector is flexible in order to be formed around the pipe joint.

The alarm cable can also be located at another site between pipes and ground surface. The alarm cable can be designed with one or several insulated metallic leads for alarm communication and for operation of the alarm nodes.

The alarm cable according to FIG. 2 can in at least one end be connected to an alarm device or a monitoring unit receiving the output signals transmitted from the detectors.

The alarm cable can also be part of the alarm system and under certain conditions detect unwanted water around the cable in an otherwise dry environment. Broken cables can also be detected because, when using a TDR, a reflected pulse from the breakage point will be reflected back, which in this way indicates that the alarm cable is broken. It is thus possible to detect if a pipe has been cut off by mistake when digging.

In one embodiment, several detectors are located around the circumference of the pipe joint so as to rapidly detect a leakage around the circumference of the pipe joint. At least one of the detectors around every pipe joint can act as an interconnecting device for the other detectors, which will make this detector slightly more complex than the others due to the connection option.

Figure 3:
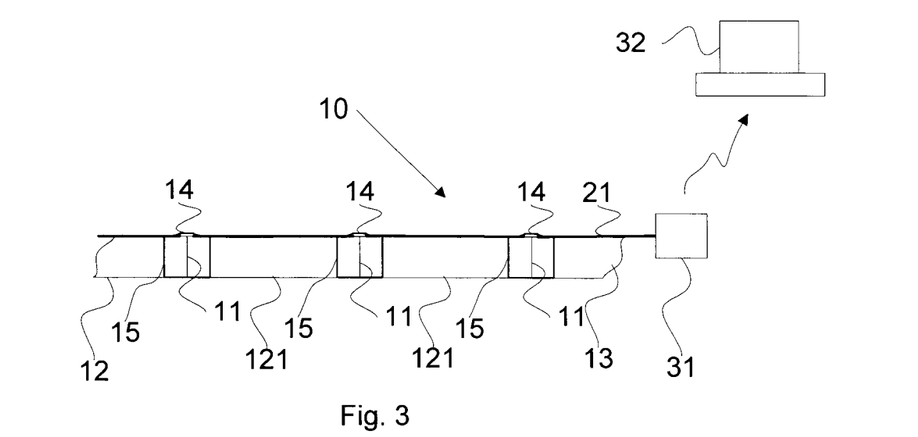
FIG. 3 describes a monitoring system according to an embodiment where every detector is connected by wire to an alarm device capable of forwarding information from the detector to a monitoring unit.
Figure 4:
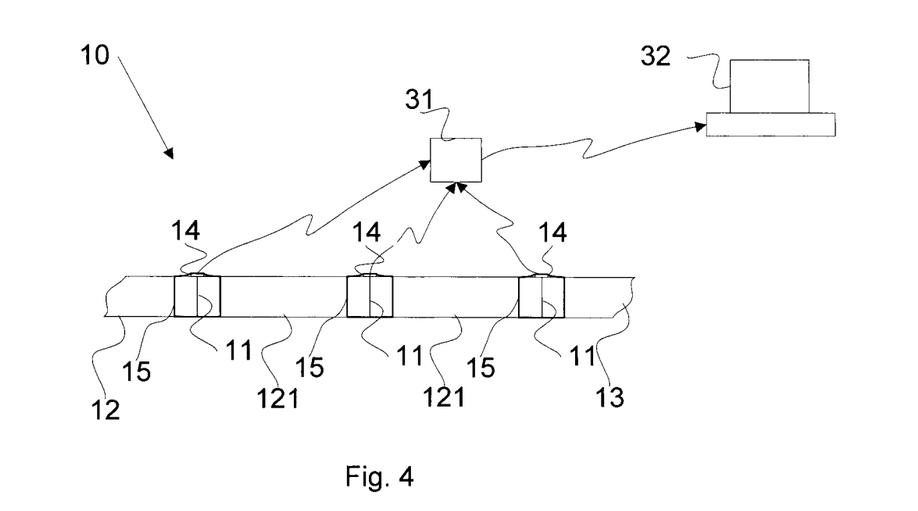
FIG. 4 describes a monitoring system according to an embodiment where every detector is wirelessly connected to an alarm device capable of forwarding information from the detector to a monitoring unit.

The alarm device can act as an intermediary device between the detectors and the monitoring unit of the monitoring system; see the monitoring system according to FIGS. 3 and 4. Consequently, the first detector can be connected to a monitoring unit, via an alarm device 31 connected to the first detector by way of an alarm cable 21 (see FIG. 3), thus enabling the alarm device 31 to transmit information to the monitoring unit 32 through an output signal via wired, e.g. LAN, or wireless communication, e.g. via protocols for Bluetooth, radio waves, GPRS, or 802.11g/b/n; see FIG. 3. FIG. 4 shows that every detector can wirelessly transmit its output signal to the alarm device 31, whereupon the alarm device 31 can forward the information to the monitoring unit 32 via wireless or wired communication.

Figure 5:
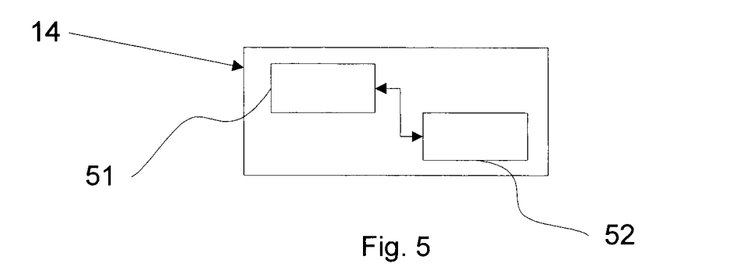
FIG. 5 describes a detector with a programmable control device according to one embodiment.

In one embodiment, according to FIG. 5, the detector comprises a control device 51 which may consist of a processor with programmable memory capacity to transmit an output signal containing status of current leakage detection to an alarm device or a monitoring unit. The control device can communicate with a leakage sensor 52 in the detector for the reading of an output signal sent from the leakage sensor 52.

The control device can further be arranged so as to transmit an output signal containing an identity or address unique to the detector. By noting the geographical position and identity or address of the detector when mounting, its geographical information can be translated into a geographical position in the alarm device or monitoring unit upon receipt of an output signal containing the unique identity or address, whereupon the geographical position of the possible leakage can be identified.

The control device can further be arranged to transmit an output signal containing information regarding the geographical position of the detector directly to the alarm device or the monitoring unit.

In some cases, the control device can be programmed with its geographical position, such as a GPS position. The control device can be arranged to attach the geographical position as part of the transmitted output signal. The geographical information attached to the output signal can be used by the alarm device or the monitoring system to identify the detector's position and consequently a possible leakage identified by said detector.

The control device can in one embodiment be arranged to transmit the output signal periodically and/or when requested by an alarm device or monitoring unit.

According to one embodiment, the detector is provided with a battery for powering the detector.

The battery can be a rechargeable battery powered via a power cable. That way the detector can detect leakage even during power failures, and forward this information to an alarm device or a monitoring unit via the connected alarm cable.

The power cable can consist of the alarm cable connecting the detectors, and the detectors to the alarm device or monitoring unit, which reduces costs for separate wiring to the detectors.

In one embodiment, the detector is powered via a power cable. It is thus not necessary to provide the detector of this embodiment with a battery, but a rechargeable battery ensures power supply during temporary power failures.

Figure 6:
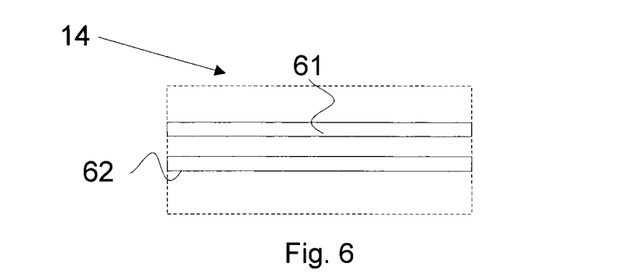
FIG. 6 describes a detector comprising two insulated detector leads.

In one embodiment according to FIG. 6, the detector consists of at least two insulated detector leads 61, 62, by means of which leakage can be identified by sensing changed impedance around the detector leads. The detector leads are arranged parallel to each other.

Figure 7:
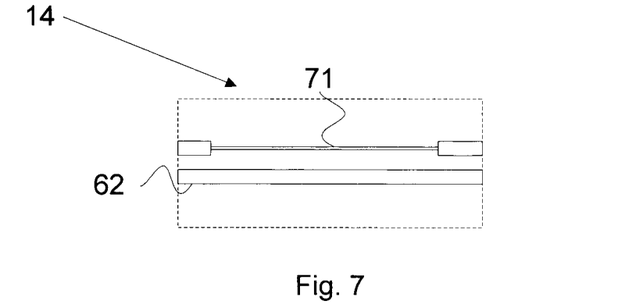
FIG. 7 describes a detector comprising two detector leads of which one is non-insulated.

In one embodiment according to FIG. 7, the detector consists of at least one non-insulated detector lead 71. Even if insulated leads, such as those described in FIG. 6 also enable leakage detection, it may in some cases be preferred that at least one non-insulated lead is non-insulated because of its increased sensitivity. Also in this embodiment, the detector leads are arranged parallel to each other.

When mounting the detector, the detector leads can initially be insulated. When the insulated detector leads are placed at the pipe joint, a portion at the pipe joint can be stripped with a tool.

In one embodiment, the detector actually consists of at least two detector leads that fit within the alarm cable. When mounting, it is thus possible to place the alarm cable along the piping system and to strip off a portion of the alarm cable's insulation at the pipe joints before the jacket piece is crimped around the pipe joint.

The jacket piece is crimped over the stripped portion. This makes it simple and cost-effective to assemble the monitoring system along the non-insulated pipes. To increase the sensitivity, every detector can comprise a cable loop of detector leads, where the at least one non-insulated detector lead is included. By arranging the detector leads in a cable loop, a greater length of detector leads can fit in the space formed by the locally provided jacket piece and the pipes.

In one embodiment, the system comprises a TDR (Time Domain Reflectometer). In such a system, the output signal transmitted from every detector can constitute a reflected signal originally transmitted from the pulse-generating TDR, which can e.g. be part of the alarm device or the monitoring unit. When the transmitted pulse from the pulse-generating device encounters an impedance difference along the alarm cable, a portion of the pulse is reflected back to the pulse-generating device. The appearance of the reflected output signal differs depending on the possible presence of leakage in the detector's surroundings, and therefore in the space created between the jacket piece and the pipes, as the sensed impedance around the detector changes in case of leakage. Detection of the leakage position can be identified by analyzing the reflected output signal. If the detector, when there is no leakage, generates a reflected output signal, this signal can be used as a reference and each received output signal from the same detector can thus be compared to the reference signal for that specific detector to identify leakage. Depending on the time it takes after the transmission of the pulse from the TDR until a reflected signal is received, the detector's position can be determined.

In one embodiment, the system comprises two TDRs, one connected to one end of the alarm cable and one connected to the other end of the alarm cable so as to enable added certainty regarding the geographical position of a leakage.

Figure 8:
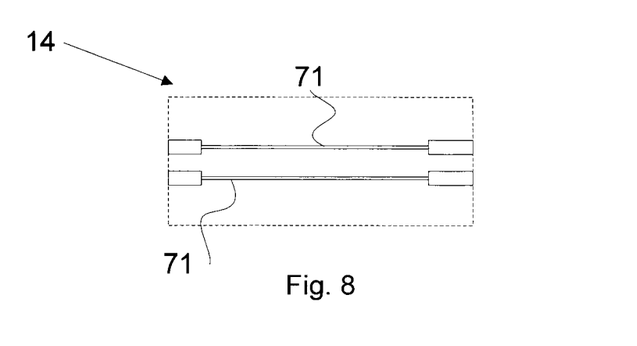
FIG. 8 describes a detector comprising two non-insulated detector leads.

In one embodiment according to FIG. 8, the detector consists of at least two non-insulated detector leads 71, which can be interlaced in a textile moisture strip connected by a wire to every non-insulated detector lead. In this embodiment also, the detector leads are arranged parallel to each other.

Figure 9:
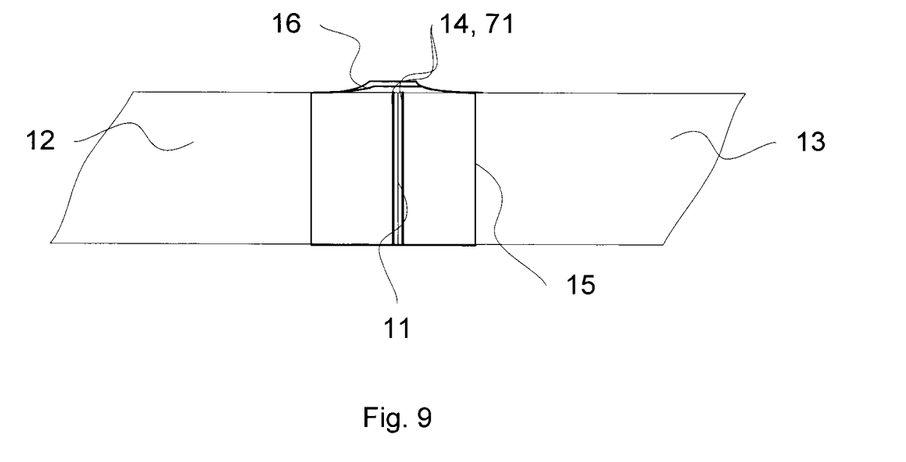
FIG. 9 describes a monitoring system where the detector consists of two non-insulated detector leads running along the circumference of the pipe joint.

In an alternative embodiment, the at least two non-insulated detector leads can be arranged around the pipes at the pipe joint to identify leakage around the entire circumference of the pipe joint; see FIG. 9. That way, a leakage at only a portion of the pipe joint can rapidly be identified.

When the non-insulated pipes are placed underground, the alarm device can be placed e.g. in a well enabling wireless transmission to a remote monitoring unit Locating the alarm device in e.g. a well reduces the risk of the wireless signal being blocked or absorbed by the ground. The alarm device can be provided with an antenna, which in some cases can protrude from the ground surface to enable improved signal transmission to or from the monitoring unit.

The alarm device or the monitoring unit can comprise a power supply providing the detectors with energy via the power cable.

The alarm device can have a unique ID or be provided with a receiver to identify its geographical position. In this embodiment, this is particularly preferred when each detector contains no unique ID linked to its geographical position. The alarm device can, when the detectors connected to the alarm device are suitable for this purpose, use a TDR to identify leakage. By determining the distance from the alarm device to the leakage and knowing the geographical position of the alarm device, the geographical position of the leakage can be determined, provided the geographical extent of the piping system is known.

In one embodiment, several alarm devices can be arranged along the length of the piping system.

By only connecting a subset of the detectors along the piping system and by knowing the geographical position of the alarm device, the position of the leakage can in some cases be identified more quickly.

The monitoring unit can include a receiver to receive the output signals, and the information included therein, such as status of leakage detection, which is transmitted from the detectors of the monitoring system, and, when applicable, the output signal from the alarm device, to identify the site of possible leakage. The monitoring unit can be provided with a display screen displaying identified leakages in the piping system to an operator. This way, an operator can quickly be made aware of the fact that a leakage has been identified, thereby promptly dispatching service personnel to the relevant geographical site of the leakage.

When the piping system comprising one or several pipes with pipe joints has been assembled and pressure-tested, an alarm cable can be mounted along the entire piping length. The cable can be mounted directly onto the pipe, e.g. using adhesive tape. Before the detector is mounted, it can be provided with a unique address and/or a GPS position, according to the above. This can be achieved by way of a portable battery-powered programming device being connected to the detector either wirelessly or via a connection cable.

According to one embodiment, address and position can be stored in the programming device and can later be transferred to the monitoring unit, such as via software.

Subsequently, the detectors are mounted at the sites where monitoring is desired. At least one detector is placed at a pipe joint. Furthermore, other detectors can be placed along the pipes, i.e., outside the zone of pipe joints, and/or at other piping elements such as pipe bends, 'T' pieces, valves, or wells.

At welded pipe joints, the detector can be mounted centrally over the weld forming the pipe joint or in close proximity to the pipe joint.

When the pipe joint is provided with sleeves spliced with rubber rings, the detector can be mounted beside the rubber ring.

When the alarm cable is mounted along the entire pipe length, the alarm cable can be cut, whereupon the free ends can be connected to the detector or using the alarm cables already connected to the detector.

When the detector is installed, the jacket piece can be mounted over the detector and the pipe joint.

After all detectors have been mounted and sealed with jacket pieces, the alarm cable is connected to the alarm device and/or monitoring unit for a test run.

When a detector issues an alarm, a message including the node address and/or GPS position is transmitted to the monitoring unit via an output signal directly from the detector or an output signal sent via an intermediary alarm device.

Figure 10:
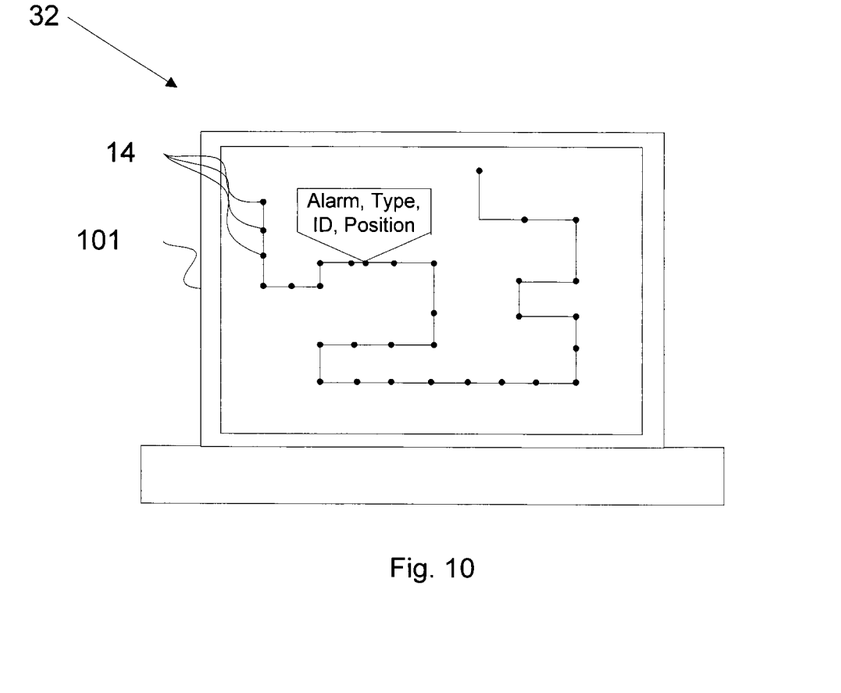
FIG. 10 describes a monitoring unit according to one embodiment with a display screen presenting an alarm drawing with the detectors included in the monitoring system, one detector issuing a leakage alarm.

In the monitoring unit, the geographical position of the alarm-issuing detector can be read from a displayed alarm drawing; see FIG. 10. When a leakage is identified, an alarm is issued, and audibly and/or visually presented on the screen 101 of the monitoring device. The alarm can include the type of leakage and the position of the leakage and/or the detector. FIG. 10 shows that a detector along the alarm drawing indicates an alarm. From the monitoring unit, information about the leakage can be forwarded to an external device, such as a mobile telephone or PC, whereupon the relevant parties can rapidly obtain information on the leakage, its geographical position, and information about the leakage-indicating detector and, as the case may be, its location in the piping system. With the alarm system described above, an incipient or suddenly occurring leak in a joint can be found very quickly.

According to one embodiment, there is described a method for the mounting of a detector according to the above for the identification and location of leakage of a fluid at at least one pipe joint consisting of two abutting non-insulated pipes for fluids. The method comprises the steps of:

mounting a detector described above for fluid detection, located at a first pipe joint;

connecting an alarm cable to the detector;

mounting a jacket piece locally over the first pipe joint, the jacket piece together with the non-insulated pipes forming a sealed space containing the first detector, the alarm cable running inside the space from the detector between the local jacket piece and at least one of the non-insulated pipes and along at least one of the non-insulated pipes.

The method can further comprise the step of mounting one end of the alarm cable to an alarm device or monitoring unit.

In one embodiment there is provided a computer readable medium containing software executable by a processor. The software comprises computer program code for performing the steps of: receiving an output signal from a detector according to an embodiment presented above, the output signal comprising information regarding the status of current leakage detection, an identity or address unique to the detector, or information regarding the geographical position of the detector. Based on the received output signal, an alarm is generated when the output signal includes information regarding leakage. The computer program code furthermore comprises code for presenting the alarm on a display screen 101.

Further, the computer program code can include code for wirelessly transmitting a signal containing the information of the received output signal to an external device, via email, SMS, or MMS. The external device can be a mobile telephone, a smartphone, an e-reader such as an iPad, or a PC or Mac, or any other device with the ability to receive the output signal and present the information of the output signal on a display screen.

In one embodiment, there is provided a mobile device comprising an executable computer program or software application arranged to receive the transmitted signal from the processor running the computer program code and present the information regarding leakage, the identity or the address unique to the detector, or information regarding the geographical position of the detector, on a display screen of the mobile device, in a way similar to that of FIG. 10.

The invention claimed is:

1. A monitoring system for the identification and location of leakage of a fluid at at least one pipe joint having two abutting non-insulated pipes for fluids, the monitoring system comprising:
    at least one first detector for detecting fluid, located at a first pipe joint;
    at least one second detector for detecting fluid, located at a second pipe joint, the first detector and the second detector being connected to each other by at least one alarm cable using time-domain reflectometer, TDR, technology to detect fluid leakage at the first or the second detector; and
    a crimpable jacket piece forming a crimp sleeve provided locally over at least the first pipe joint, the jacket piece together with the non-insulated pipes forming a sealed space containing the first detector and the first pipe joint.

2. The monitoring system as claimed in claim 1, wherein the first or the second detector is connected to a monitoring unit or alarm device via the at least one alarm cable.

3. The monitoring system as claimed in claim 1, wherein the first detector is connected to a monitoring unit, via an alarm device connected to the first detector by way of the at least one alarm cable, the alarm device being capable of transmitting information to the monitoring unit via wired or wireless communication.

4. The monitoring system as claimed in claim 1, wherein one of the at least one first detector and the at least one second detector comprises at least two detector leads, wherein at least one of the at least two detector leads is a non-insulated detector lead, whereupon a sensed impedance between the non-insulated detector lead and its surrounding is changed in the presence of leakage.

5. The monitoring system as claimed in claim 1, in which the first detector or the second detector comprises at least one detector lead that is non-insulated.

6. The monitoring system as claimed in claim 4, wherein the change in impedance, when an electric pulse arrives at one of the at least one first detector and the at least one second detector, gives rise to a reflected pulse being returned in the opposite direction.

7. The monitoring system as claimed in claim 4, wherein one of the at least one first detector and the at least one second detector comprises at least two non-insulated detector leads interlaced in a textile moisture strip and running around the entire circumference of the pipe joint.

8. The monitoring system as claimed in claim 1, wherein at least one of the at least one first detector and the at least one second detector comprises a control device for transmitting an output signal containing information regarding status of current leakage detection to an alarm device or monitoring unit.

9. The monitoring system as claimed in claim 8, wherein the control device is further arranged so as to transmit an output signal containing an identity or address unique to one of the at least one first detector and the at least one second detector.

10. The monitoring system as claimed in claim 8, wherein the control device is further arranged so as to transmit an output signal containing information regarding the geographical position of one of the at least one first detector and the at least one second detector.

11. The monitoring system as claimed in claim 8, wherein the control device is arranged so as to transmit the output signal periodically and/or when requested by an alarm device or monitoring unit.

12. The monitoring system as claimed in claim 1, wherein at least one of the at least one first detector and the at least one second detector further comprises a battery for powering the detector.

13. The monitoring system as claimed in claim 1, wherein at least one of the at least one first detector and the at least one second detector is further powered through a power cable connected to the detector.

14. The monitoring system as claimed in claim 1, wherein at least one of the at least one first detector and the at least one second detector further comprises a battery for powering the detector, the battery being rechargeable and charged through a power cable.

15. The monitoring system as claimed in claim 13, wherein the power cable comprises one of the at least one alarm cable.

16. The monitoring system as claimed in claim 1, wherein the at least one second detector is located along another non-insulated pipe in the piping system outside a pipe-joint zone, and is contained in a second sealed space formed by a second jacket piece provided locally over the second detector, the second jacket piece together with the non-insulated pipe forming a second sealed space containing the second detector.

* * * * *